US010004129B2

(12) United States Patent
Jiang et al.

(10) Patent No.: US 10,004,129 B2
(45) Date of Patent: Jun. 19, 2018

(54) EXTENDING COVERAGE IN AN OUTDOOR LIGHTING SYSTEM BY USING A MOBILE DEVICE AND SHORT-RANGE WIRELESS COMMUNICATIONS

(71) Applicant: PHILIPS LIGHTING HOLDING B.V., Eindhoven (NL)

(72) Inventors: Dan Jiang, Westford, MA (US); Dave Alberto Tavares Cavalcanti, Mahopac, NY (US); Talmai Brandão De Oliveira, North Andover, MA (US); Yong Yang, Ossining, NY (US); Amjad Soomro, Hopewell Junction, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/514,614

(22) PCT Filed: Sep. 25, 2015

(86) PCT No.: PCT/IB2015/057380
§ 371 (c)(1),
(2) Date: Mar. 27, 2017

(87) PCT Pub. No.: WO2016/046794
PCT Pub. Date: Mar. 31, 2016

(65) Prior Publication Data
US 2017/0231070 A1    Aug. 10, 2017

Related U.S. Application Data

(60) Provisional application No. 62/055,028, filed on Sep. 25, 2014.

(51) Int. Cl.
*H05B 37/02* (2006.01)
*H04W 4/00* (2018.01)
(Continued)

(52) U.S. Cl.
CPC ........ *H05B 37/0272* (2013.01); *H04W 4/008* (2013.01); *H04L 69/18* (2013.01);
(Continued)

(58) Field of Classification Search
CPC ..... H04W 52/00; H04W 52/02; H04W 76/00; H05B 37/0272
(Continued)

(56) References Cited

U.S. PATENT DOCUMENTS 8,766,544 B2 * 7/2014 Velazquez .......... H05B 37/0272
315/132
9,198,264 B2 * 11/2015 Challapali .......... H05B 37/0245
(Continued)

FOREIGN PATENT DOCUMENTS

| JP | 2012004062 A | 1/2012 |
|---|---|---|
| KR | 101036582 B1 | 5/2011 |
| WO | 2012090142 A2 | 7/2012 |

*Primary Examiner* — Thuy Vinh Tran (57) ABSTRACT

A method and system to extend the coverage of Outdoor Lighting Networks (OLNs) through the use of authorized mobile devices travelling around to establish a virtual connectivity link (i. e., storing data and, when in reach, using short-range wireless communication protocols) between isolated light points (or groups of light points) and connected light points so that lighting commands and data can be exchanged between the two sets of lighting points is disclosed.

21 Claims, 8 Drawing Sheets

Mobile Device (MD) Authentication and Certification Method (51) Int. Cl.
*H04W 84/18* (2009.01)
*H04L 29/06* (2006.01)
*H04W 76/00* (2018.01)
*H04W 52/00* (2009.01)

(52) U.S. Cl.
CPC ............ *H04W 52/00* (2013.01); *H04W 76/00* (2013.01); *H04W 84/18* (2013.01)

(58) Field of Classification Search
USPC .......................................... 315/291; 700/295
See application file for complete search history.

(56) References Cited

U.S. PATENT DOCUMENTS

| | | | |
|---|---|---|---|
| 9,374,875 B2* | 6/2016 | Ben-Moshe | H01R 33/945 |
| 9,713,231 B2* | 7/2017 | Kelly | G08C 17/02 |
| 2007/0057807 A1 | 3/2007 | Walters et al. | |
| 2013/0057158 A1 | 3/2013 | Josefowicz et al. | |
| 2016/0150622 A1* | 5/2016 | Flinsenberg | H05B 37/0227 |
| | | | 315/297 |
| 2016/0174345 A1* | 6/2016 | Kelly | G08C 17/02 |
| | | | 315/131 |
| 2016/0286627 A1* | 9/2016 | Chen | H05B 37/0245 |

* cited by examiner

FIG. 1

Prior Art

EXTENDING COVERAGE IN AN OUTDOOR LIGHTING SYSTEM BY USING A MOBILE DEVICE AND SHORT-RANGE WIRELESS COMMUNICATIONS

CROSS-REFERENCE TO PRIOR APPLICATIONS

This application is the U.S. National Phase application under 35 U.S.C. § 371 of International Application No. PCT/IB2015/057380, filed on Sep. 25, 2015 which claims the benefit of U.S. Provisional Patent Application No. 62/055,028, filed on Sep. 25, 2014. These applications are hereby incorporated by reference herein.

The instant application relates to the field of lighting and more particularly to managing an outdoor lighting system.

Outdoor lighting is one of the most ubiquitous public services found in every city. Although most of the outdoor lighting installed base uses relatively old and simple technology with only limited functionality, such as on/off switch based on ambient light or an internal clock, systems for remote management of outdoor lighting (tele-management) have been recently introduced by several companies. Such systems are based on Outdoor Lighting Networks (OLNs) for remote management, monitoring and control of light points. Outdoor Lighting Networks are being deployed to provide remote management of light points for municipality. OLNs provide many benefits to the customers (e.g. cities, departments of transportation, and private businesses) including energy savings, reduced maintenance costs, less lighting pollution, etc.

However, in some areas, it's not feasible to deploy the new technology cost effectively. For instance, large pole to pole distance results in bad radio signal reception, poor cellular network service in the rural areas, and small number of poles in the network cannot offset the high cost of setting up a mesh network or a cellular base station and make the solution cost effective.

Hence, there is a need in the industry for a method and system for managing OLNs. The present invention describes a system for providing communication to isolated elements within an outdoor lighting network.

The present invention discloses a method and system to extend the coverage of OLNs through the use of authorized mobile devices to establish a connectivity link between isolated light points (or groups of light points) and connected light points so that lighting commands and data can be exchanged between the two sets is disclosed.

An advantage of the invention is to reduce the cost of connecting remote locations to an existing OLN while enabling execution of delay tolerant operations and management of the lighting infrastructure. In addition, the isolated light points in the invention are transparent to a Lighting Management Server, and all data exchange happens between connected light points and isolated light points without the intervention (or awareness) of the Lighting Management Server.

In one aspect of the invention, a method for light management is disclosed herein wherein a mobile device provides a virtual communication link between connected lighting elements and the isolated lighting elements. In accordance with the principles of the invention, the mobile device registers with a light management system and receives a unique identification that is used to identify the mobile device, the mobile device further communicates with connected lighting elements in the network and identifies isolated lighting elements. The mobile device further creates an association between connected lighting elements and isolated lighting elements, wherein the association provides information regarding the protocols used to communicate between the connected and isolated lighting elements.

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such elements is not provided herein. The disclosure herein is directed to also variations and modifications known to those skilled in the art.

Figure 1:
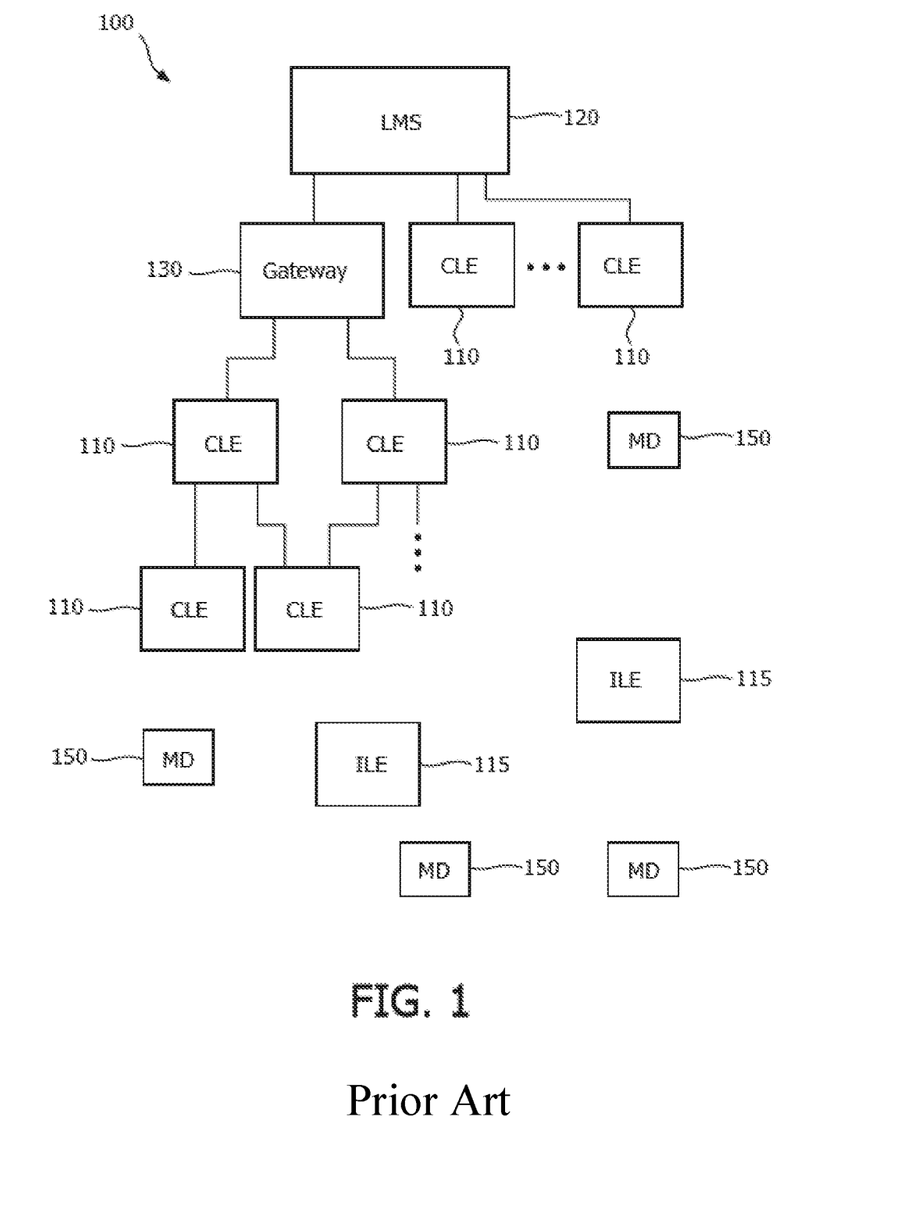
FIG. 1 illustrates an exemplary outdoor lighting network (OLN).

FIG. 1 illustrates a conventional outdoor lighting network (OLN) 100 including a plurality of outdoor lighting elements 110 that are distributed over a generally wide area. The connected outdoor lighting elements 110 are typically connected to a light management system 120. The light management system (LMS) 120 controls the operation of each of the outdooring lighting elements 110. For example, the light management system 120 may determine a turn-on, or a turn-off, time for each of the connected lighting elements 110. The turn-on and/or turn-off times may be determined based on a corresponding sunset or sunrise (or a predetermined time before or after sunset or sunrise).

As shown, the connection between the light management system 120 and the outdoor lighting elements 110 is a typically direct connection, such that the light management system 120 has a direct connection to the outdoor lighting elements 110 (hereinafter referred to as connected lighting elements 110).

However, not all outdoor lighting elements 110 are in a direct connection with the light management system 120 due primarily to costs involved in creating the direct connection.

In such cases, Outdoor Lighting Networks are being deployed to provide remote management of light points.

Hence, as shown in FIG. 1, a mesh network configuration may be established, such the light management system 120 may be in communication with at least one gateway device 130. Each of the at least one gateway devices 130 being in communication with one or more outdoor lighting elements 110.

In this case, the gateway device 130 provides two-way communication between the outdoor lighting elements 110 and the light management system 120. Thus, the light management system 120 may control operation of the outdoor lighting elements 110 through the gateway 130, which are also referred to as "connected lighting elements."

However, in some areas, it is not feasible to deploy the new technology cost effectively. For instance, large pole to pole distance results in bad radio signal reception, poor cellular network coverage in the rural areas, and small number of poles in the network cannot offset the high cost of setting up a mesh network or a cellular base station therefore make the solution cost effective.

The instant invention reduces the cost of connecting remote (isolated) lighting elements to an existing OLN while enabling execution of delay tolerant operations and management of the lighting infrastructure. In accordance with the principles of the invention, the isolated lighting elements 115 are transparent to Light Management System 120, and all data exchange happens between connected lighting elements 110 and isolated lighting elements 115 without the intervention (or awareness) of Light Management System 120.

In one aspect of the invention, users of mobile devices 150 may subscribe to the Light Management System 120 first for to obtain authorization and then to operate as a virtual connectivity for isolated lighting elements 115 within OLN 100.

Thus, in accordance with the principles of the invention, isolated lighting elements 115 may be in communication with a connected lighting element 110 through a corresponding mobile device 150. The virtual connectivity provided by the mobile device 150 provides the LMS 120 with the ability to monitor and control the operation of the isolated lighting element 115 without incurring the cost of installing a direct connection to the isolated lighting element 115 or including the isolated lighting element 115 in the mesh network.

Figure 2:
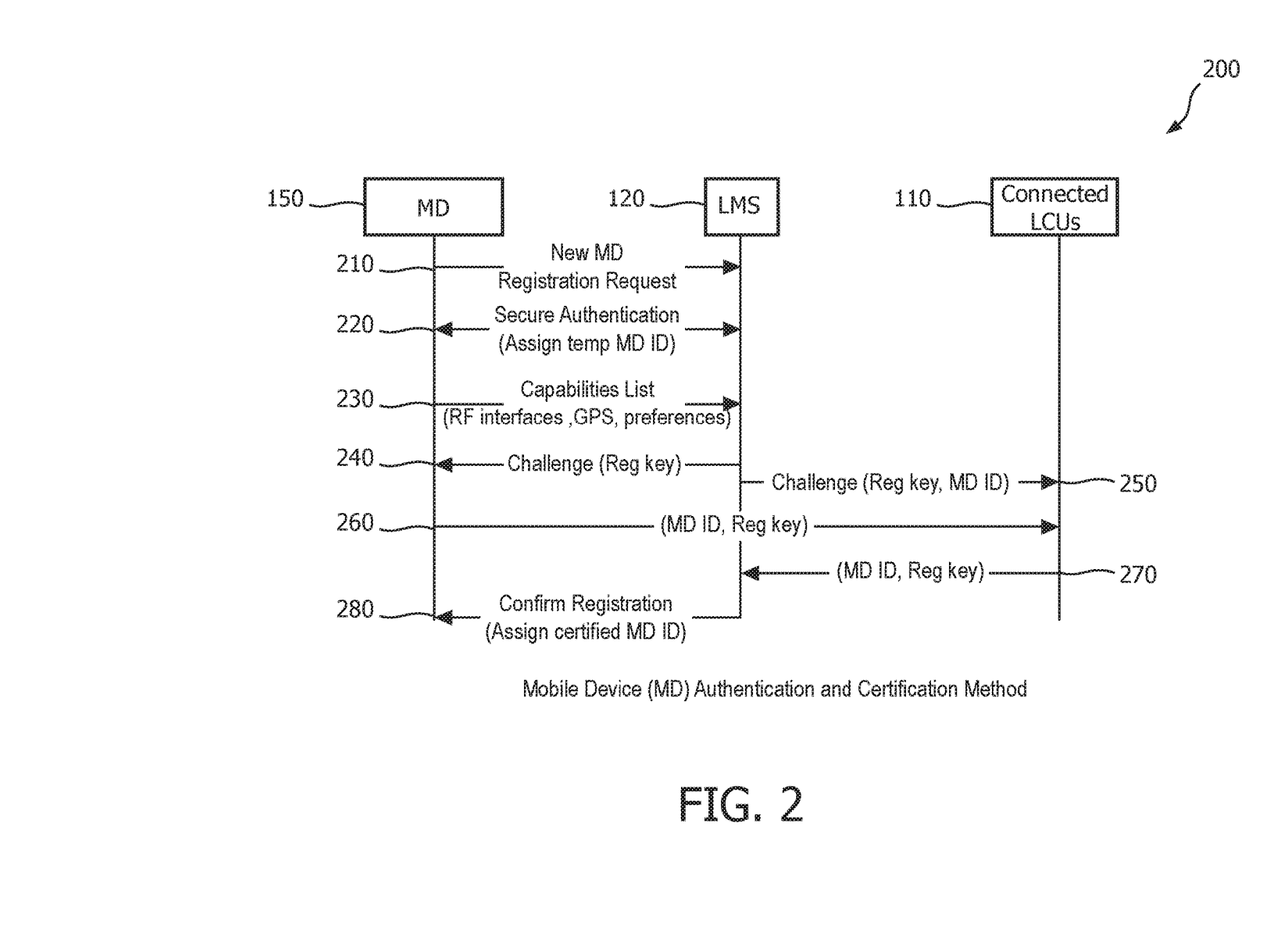
FIG. 2 illustrates an exemplary interactive flow diagram in accordance with the principles of the invention.

FIG. 2 illustrates an exemplary process 200 for authorizing and authenticating a mobile device 150 to operate as a virtual connection to an isolated lighting element 115.

In this illustrated exemplary process 200, mobile device 150 may register with a light management system 120 through a communication with the light management system 120. As would be recognized the communication protocol may be one of a conventional cellular communication protocol. However, it would be further recognized that the communication protocol may be one of another type of wireless communication such as WIFI, BLUETOOTH, Zig-Bee, NFC (Near Field Communication), DSRC (Dedicated Short Range Communication), infra-red, visible light, etc. Further still, communication with the light management system 120 may be a physical one, wherein the mobile device 150 is in physical contact with an interface to the Light Management System 120. A physical link may be one where the Light Management System 120 provides provisioning (pre-loading) a plurality of mobile devices to be used as virtual connection path devices.

As illustrated, the mobile device 150 registers with the LMS 120 at step 210. The registration step may be to identify the mobile device 150 as a new device. In response the LMS 120 assigns and provides a mobile identification value to the mobile device 150 at step 220. The mobile identification value provides a unique identification (MD_ID) to the mobile device 150. At step 230, the mobile device 150 provides to the light management system 120 information regarding the capabilities of the mobile device 150. For example, the information provided may include information regarding the cellular network configuration (e.g., GSM, CDMA, 3G, LTE/4G, 5G), the short range communication capability (e.g., BLUETOOTH), location determination capability (e.g., GPS enabled), and the operating preferences, etc.

At step 240, the light management system 120 provides a registration key to the mobile device 150 and at step 250 provides the registration key and the MD_ID to connected lighting element(s) 110.

At step 260, the mobile device 150 provides the registration key and the MD_ID to the connected lighting element(s) 110. At step 270, the connected lighting element(s) 110 authenticates the received registration key and MD_ID received by both the mobile device 150 and the light management system 120 and provides an indication of the authentication of the mobile device 150 to the light management system 120.

At step 280, responsive to the indication of the authentication of the mobile device 150, the light management system 120 provides an authenticated certificate to the mobile device 150.

Figure 3:
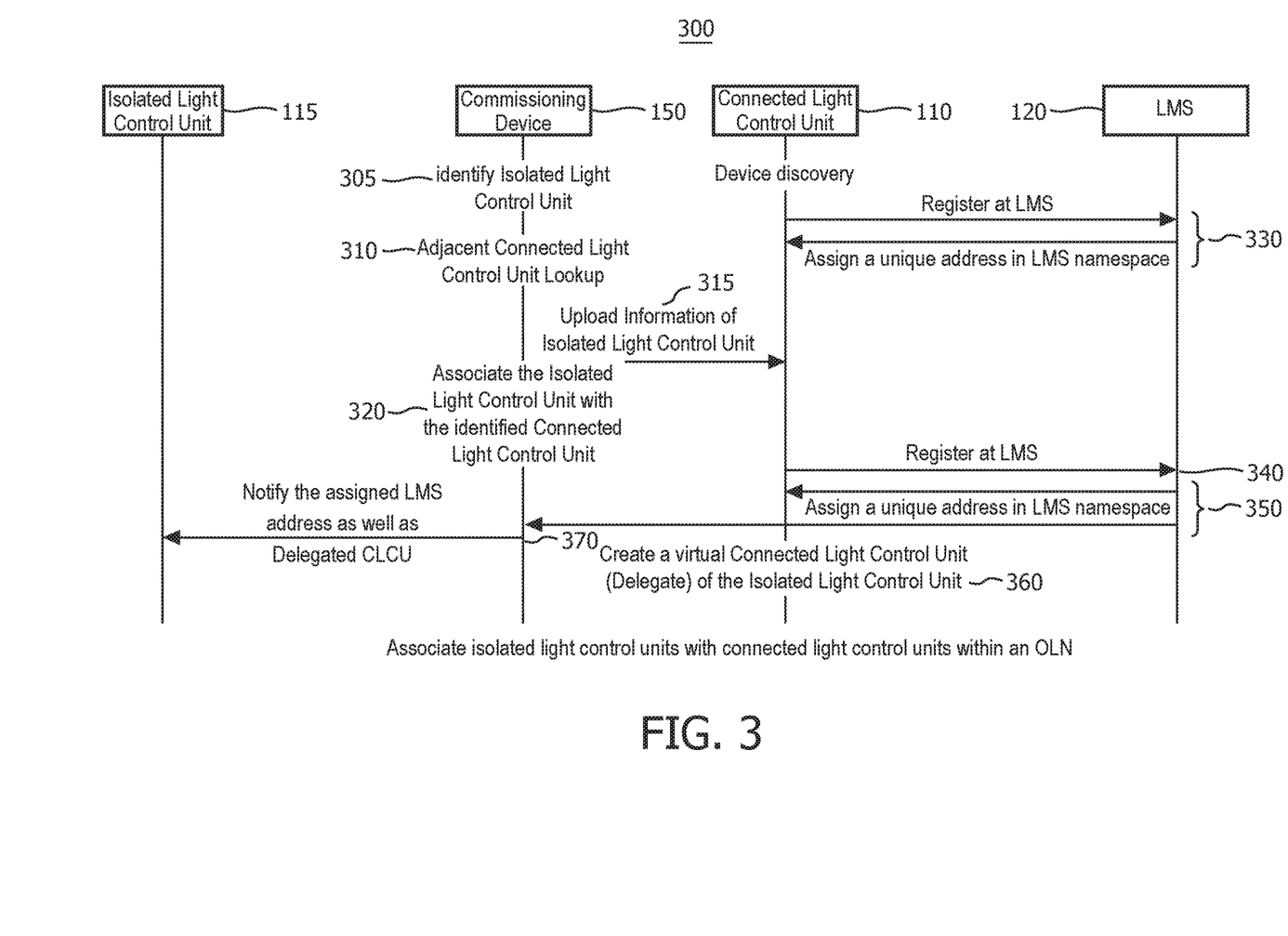
FIG. 3 illustrates a second exemplary interactive flow diagram in accordance with the principles of the invention.

FIG. 3 describes an exemplary process 300 to associate and register isolated lighting elements 115 with the connected lighting elements 110, so that operation and management of such lighting elements is transparent from the LMS 120 stand point. In other words, the LMS 120 manages both connected (110) and isolated (115) lighting elements in a similar manner.

In this illustrated exemplary process the mobile device 150 may determine that it is located near an isolated lighting element 115. Such determination may be made by receiving information from an isolated lighting element 115 through a short range communication (e.g., WIFI, BLUETOOTH, etc.) at step 305. For example, when an engineer installs a light point, which is supposed to automatically connect to LMS 120 by direct cellular link or mesh network, but because of poor cellular coverage or limitations of mesh network reachability, the lighting element doesn't have the connection to LMS 120. Hence, the lighting element may be considered an isolated lighting element. At the same time, the engineer reports the information of the light point (lighting element) to LMS 120 by a second means. As an example, a mobile device may be used to send the installation completion message to LMS 120 after installation. LMS 120 may maintain a list of such isolated lighting element(s), and inform participating mobile device 150 of the existence of the isolated lighting element 115.

At step 310, the mobile device 150 may determine a nearest connected lighting element 110 to which it is registered (see FIG. 2). For example, mobile device 150 during the registration process (see FIG. 2) may maintain a list of connected lighting elements 110 and their locations (absolute, regional, local, etc.).

At step 315, the mobile device 150 communicates information regarding the isolated lighting element(s) 115 (such as location, network address, lamp related information etc.) to the connected lighting elements(s) 110. In one aspect of the invention, the isolated lighting element 115 sends its information first to mobile device 150 using any of the currently available short range communication protocols. The mobile device 150 saves the information in its local storage. When the mobile device 150 is physically within communication range of a registered connected lighting element, 110, then the mobile device 150 sends the saved information to the connected lighting element 110. In another aspect of the invention, the mobile device 150 sends information regarding the isolated lighting element 115 to the registered connected lighting element 110 when it identifies a registered connected lighting element 110 within its communication range. In this example, the mobile device works as a gateway between isolated lighting element 115 and connected lighting element 110. In another aspect of the invention, the mobile device 150 sends the received information regarding the isolated lighting element 115 to LMS 120 directly. Information regarding connected lighting element(s) within a geography adjacency may also be provided to the LMS 120.

At step 320, the mobile device 150 creates an association between the isolated lighting element(s) 115 and the identified connected lighting element 110.

At step 330, the connected lighting element(s) 110 and the light management system 120 establish an association with each other, wherein the connected lighting element(s) 110 register with the LMS 120 and the LMS 120 assigns an identification to the connected lighting element(s) 110. This association may be completed when the connected lighting element(s) 110 are initially registered with the LMS 120.

At step 340, the connected lighting element(s) 110 registers the isolated lighting element 115 with the LMS 120 by providing information regarding the isolated lighting element(s) 115 and the identification (MD_ID) of the mobile device 150 detecting the isolated lighting element(s) 115. The LMS 120 assigns a unique identification to the isolated lighting element(s) 115 and at step 350 provides the assigned identification to the connected lighting element 110 and the mobile device 150. Although, the exemplary process illustrates the LMS 120 being in communication with the connected lighting element 110, it would be appreciated that an alternative design would be the LMS 120 providing the assigned identification of the isolated lighting element 115 to the mobile device 150, directly.

At step 360, the connected lighting element 110 creates a virtual link designation that establishes the connected lighting element 110 as the light control element and forwards this information to the mobile device.

At step 370, the mobile device 150 provides the assigned identification and information regarding the connected lighting element 110 operating as a light control element to the isolated lighting element 115.

Figure 4:
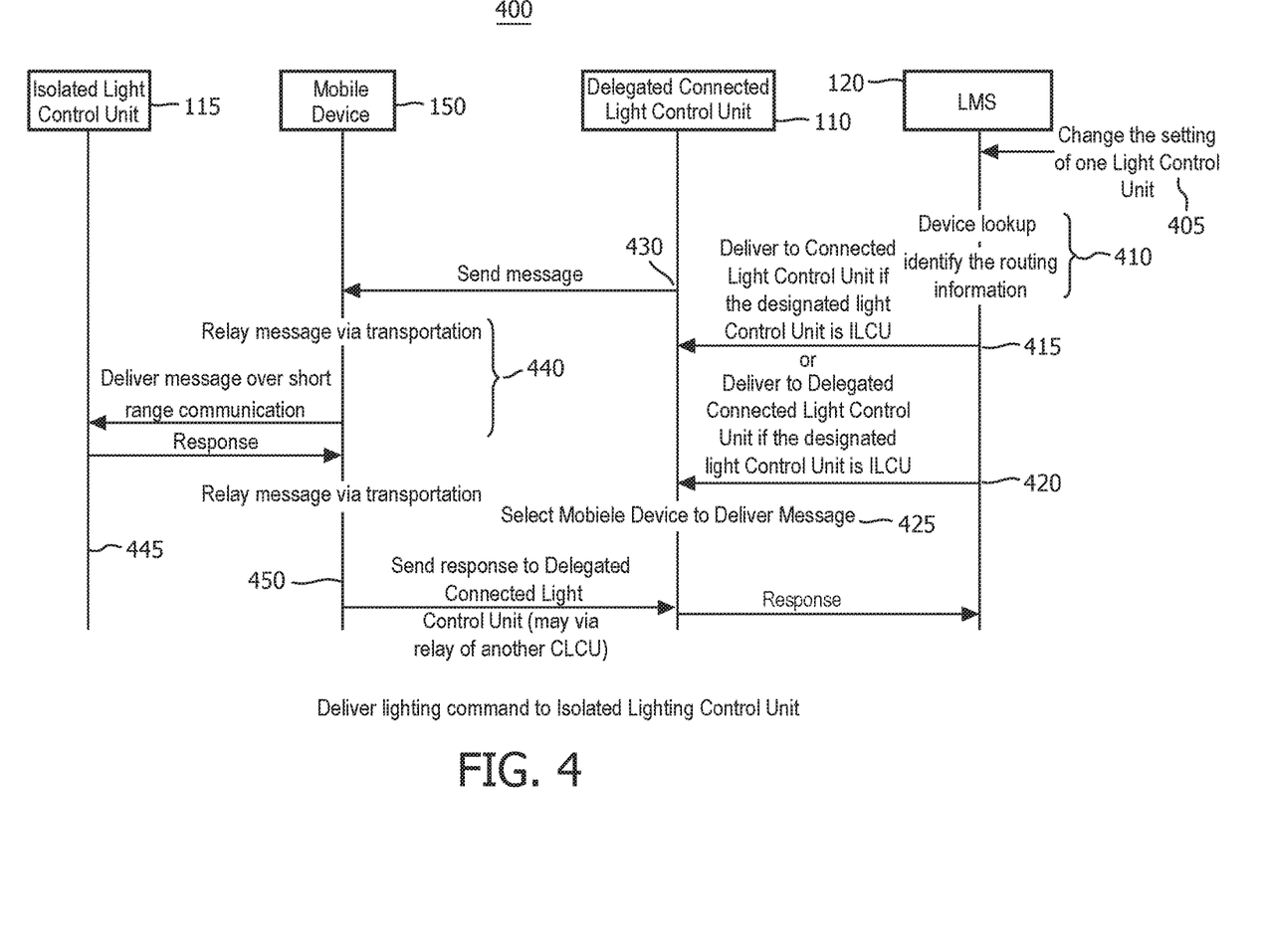
FIG. 4 illustrates a third exemplary interactive flow diagram in accordance with the principles of the invention.

FIG. 4 illustrates an exemplary process 400 for providing instruction to an isolated lighting element 115 in accordance with the principles of the invention.

In this exemplary process 400, LMS 120 receives inputs from an input device (not shown), for example, to change the light settings of the OLN (step 405). As would be appreciated the LMS 120 is typically a computer controlled system and input devices, such as keyboard entry, network connection, etc. are well-known elements of conventional computer systems and details of the elements of computer controlled systems need not be discussed in detail, herein.

At step 410, LMS 120 identifies network and device configurations and provides information regarding the changes to the light settings to the devices within the network. In one case, the change information is provided to the connected lighting elements 110 (step 415). The connected lighting elements 110 having associations with isolated lighting elements 115 that may be used to provide the change information to the isolated lighting elements 115. Such associations may include, for example, routing information associated with the isolated lighting element 115 (step 420).

At step 425, the connected lighting element 110 receiving light setting change information identifies a registered mobile device located within a predetermined distance from an associated isolated lighting element 115. The predetermined distance may be determined based on the short-range communication protocol used to communicate with the isolated lighting element 115. For example, BLUETOOTH communication is typically limited to 30 feet, whereas WIFI communication may be limited to about 100 feet. As would be recognized, the isolated lighting elements 115 are generally stationary and their locations are fixed. The location of the mobile devices may be determined based on GPS (Global Positioning System) location measurements. GPS is a well-known method of determining location of mobile devices and a detailed discussion of the principles of GPS is not necessary for the understanding of the instant invention.

After designating one of the plurality of registered mobile devices as being a virtual communication pathway to the isolated lighting element 115, the connected lighting element 110 provides the light setting information to the selected mobile device 150, at step 430.

At step 440, the selected mobile device 150 provides the light setting information to the isolated lighting element 115 using a short range communication protocol. As would be appreciated, the short range communication protocol may be preselected or determined dynamically. In the former case, the isolated lighting element 115 may be provisioned with a single short range communication protocol. In this case, the connected lighting element 110 has knowledge of this provisioning and uses this knowledge to select a mobile device 150 within the predetermined from the isolated lighting element 115. In the latter case, the isolated lighting element 115 may be provisioned with one or more short range protocols and the connected lighting element 110 may provide a recommended protocol to the selected mobile device 150. The selected mobile device 150 may then communicate with the isolated lighting element 110 using the recommended protocol.

The isolated lighting element 115, after receiving the light setting change information from mobile device 150 may store the change setting and implement the change settings when required.

At step 445, the isolated lighting element 115 may then provide acknowledgement or confirmation of receipt of the change instructions through the selected mobile device 150, which is used as a virtual link to connected lighting element 110 (step 450). Connected lighting element 110 provides an acknowledgement of receipt of its own change setting instruction and/or acknowledgement of receipt of the change setting instruction (from mobile device 150) at step at 460. In either case, LMS 120 receives acknowledgment of receipt of instructions from a connected lighting element 110 and/or an isolated lighting element 115 in a similar manner.

As isolated lighting elements 115 operate generally autonomously, the isolated lighting elements 115 generate log files that contain information such as metering data, voltage/current measurements, and system status/events. This information may be collected periodically, continuously or as events occur. After certain amount of data is collected or at predetermined time intervals (e.g., once per day) the isolated lighting element 115 may send the collected data to the associated connected lighting element 110, which will forward the data to the LMS 120.

Figure 5:
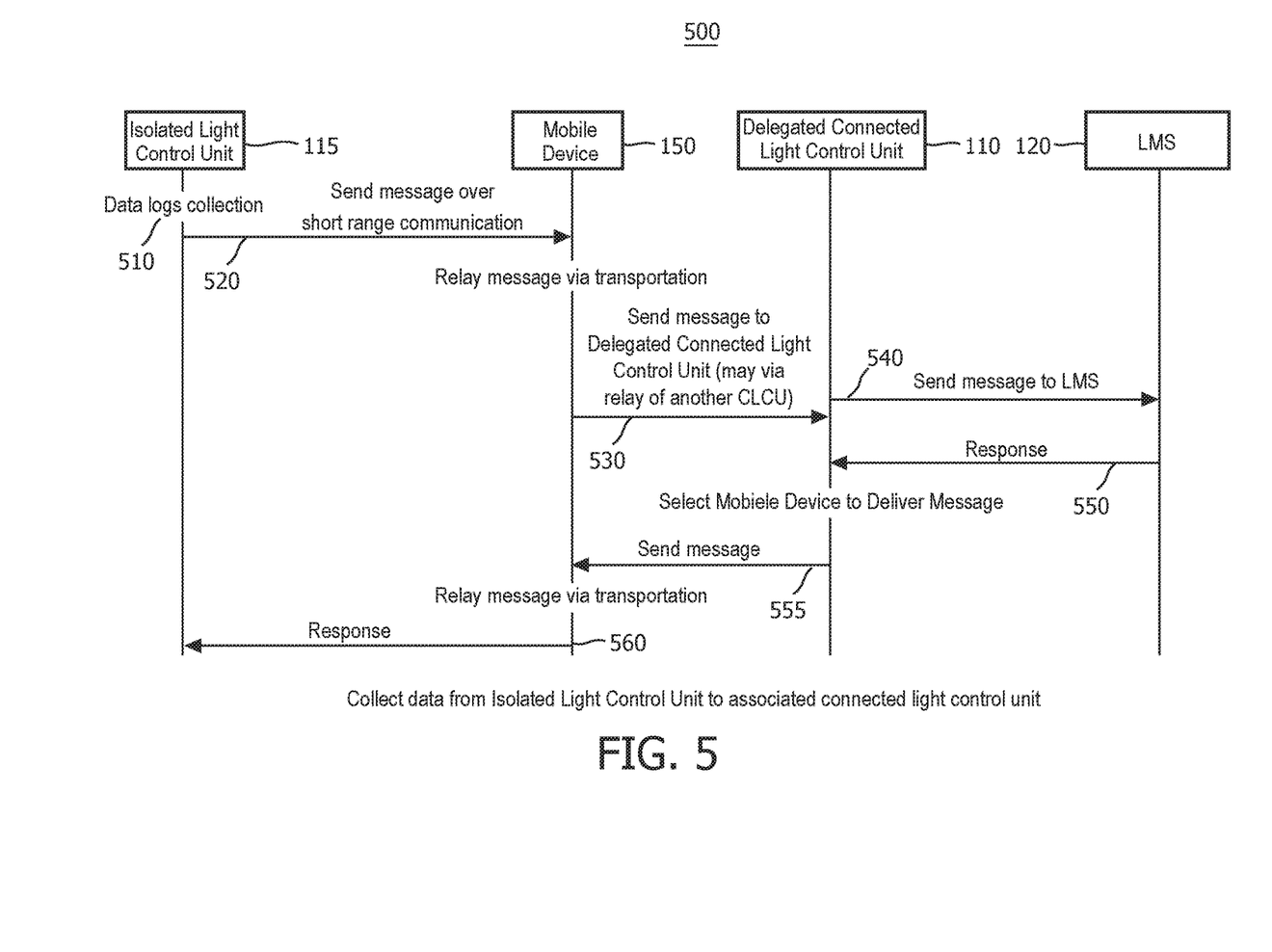
FIG. 5 illustrates an exemplary application of the system shown in FIG. 1 in accordance with the principles of the invention.

FIG. 5 illustrates a second exemplary process in accordance with the principles of the invention.

At step 510, data is collected in the isolated lighting element 115. Data regarding metering, voltage/current, status, for example, is collected and logged.

At step 515, the isolated lighting element 115 initiates a search for registered mobile devices 15 within a predetermined range of the isolated lighting element 115. As previously discussed, the predetermined range may be a function of the short range communication protocol to be used to communicate between the isolated lighting element 115 and the mobile device 150. As would be recognized, the greater the predetermined range available for communication, the greater the number of mobile devices within predetermined from which to select. In one aspect of the invention, the mobile device with the shortest distance to the isolated lighting element 115 may be selected. In this manner, the short range communication protocol may be the most reliable. In this case, a determination of the location of the mobile device and the location of the isolated lighting element 115 may be determined using GPS (Global Position System) to determine a distance between the mobile device 150 and the isolated lighting element 115. In another aspect of the invention, when data information transfer is not free, then the mobile device 150 may be selected that requires the minimum cost. In another aspect of the invention, the mobile device 150 may be selected based on the communication protocols available to the isolated lighting element 115. For example, if a distance between the isolated lighting element 115 and the mobile device 150 is determined to be 50 feet and BLUETOOTH communication is limited to 45 feet, then a different communication protocol (e.g., WIFI) may be utilized to provide more reliable communication.

At step 520, the collected data is transmitted to the selected mobile device 150. The selected mobile device 150, operating as a virtual link, relays the received information to the associated connected lighting element 110 at step 530. The connected lighting element 110 then communicates the provided information to the LMS 120 at step 540.

In one aspect of the invention, the LMS 120 may acknowledge receipt of the collected data by transmitting an acknowledgement message back to the isolated lighting element 115 through the connected lighting element 110 and selected mobile device 150 (steps 550, 555, 560).

Although, the invention has been described with regard to communication from the LMS 120 to the connected lighting elements 110, it would be recognized that the principles of the invention apply to lighting elements 110 that are connected in a network configuration, wherein the lighting elements are connected to the LMS 120 through gateway 130.

Figure 6:
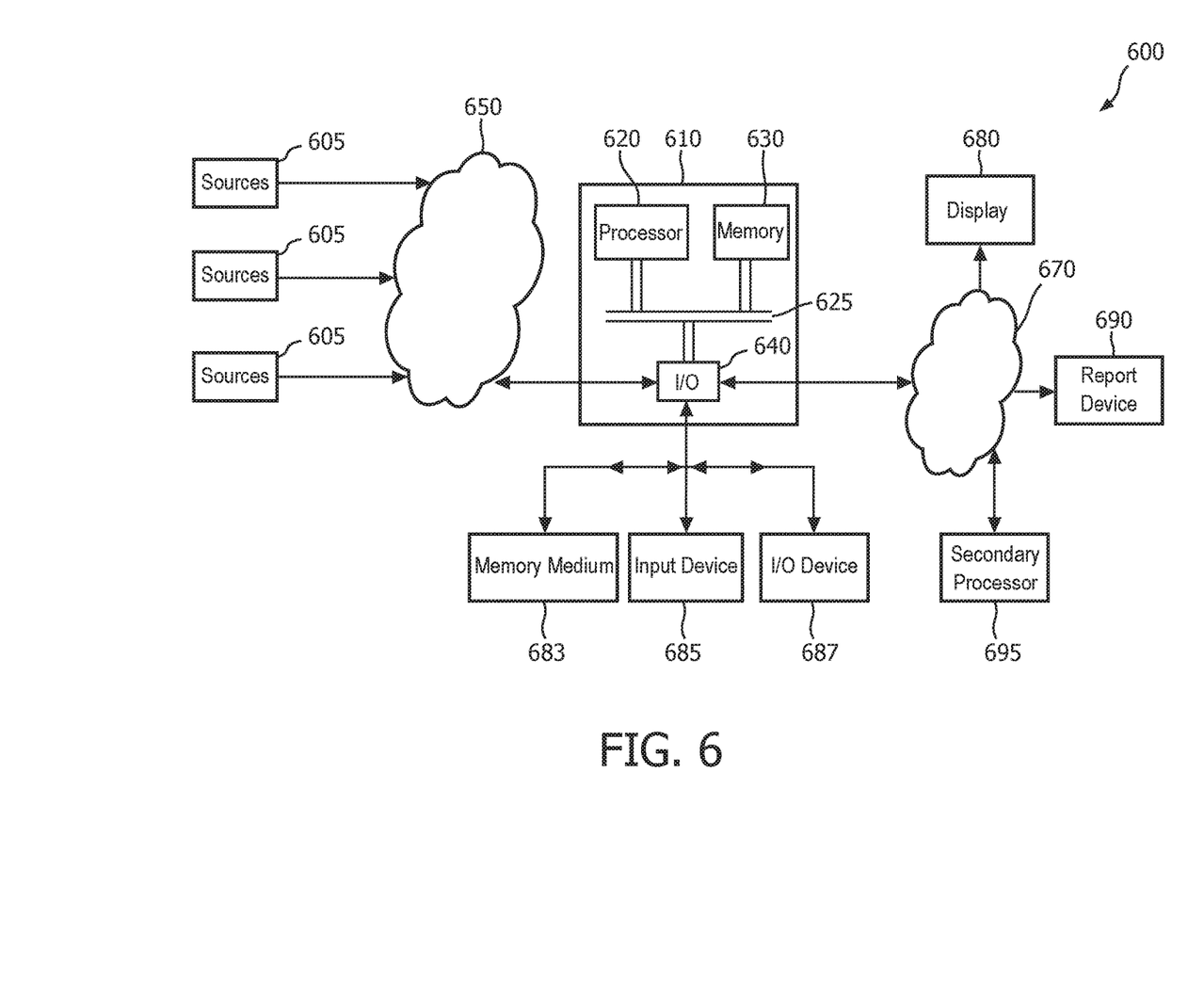
FIG. 6 illustrates a block diagram of a system for controlling OLN operation in accordance with the principles of the invention.

FIG. 6 illustrates a system 600 for implementing the principles of the invention shown herein. In this exemplary system embodiment 600, input data is received from sources 605 (e.g. mobile device 150 to connected lighting element 110, mobile device 150 to isolated lighting element 115, connected lighting element 110 to LMS 120) over network 650 and is processed in accordance with one or more programs, either software or firmware, executed by processing system 610. The results of processing system 610 may then be transmitted over network 670 for viewing on display 680, reporting device 690 and/or a second processing system 695.

Processing system 610 includes one or more input/output devices 640 that receive data from the illustrated sources or devices 605 over network 650. The received data is then applied to processor 620, which is in communication with input/output device 640 and memory 630. Input/output devices 640, processor 620 and memory 630 may communicate over a communication medium 625. Communication medium 625 may represent a communication network, e.g., ISA, PCI, PCMCIA bus, one or more internal connections of a circuit, circuit card or other device, as well as portions and combinations of these and other communication media.

Processing system 610 and/or processor 620 may be representative of a handheld calculator, special purpose or general purpose processing system, desktop computer, laptop computer, palm computer, cell phone, smart phone or personal digital assistant (PDA) device, etc., as well as portions or combinations of these and other devices that can perform the operations illustrated.

Processor 620 may be a central processing unit (CPU) or dedicated hardware/software, such as a PAL, ASIC, FGPA, operable to execute computer instruction code or a combination of code and logical operations. In one embodiment, processor 620 may include code which, when executed by the processor, performs the operations illustrated herein. The code may be contained in memory 630, may be read or downloaded from a memory medium such as a CD-ROM or floppy disk, represented as 683, may be provided by a manual input device 685, such as a keyboard or a keypad entry, or may be read from a magnetic or optical medium (not shown) or via a second I/0 device 687 when needed. Information items provided by devices 683, 685, 687 may be accessible to processor 620 through input/output device 640, as shown. Further, the data received by input/output device 640 may be immediately accessible by processor 620 or may be stored in memory 630. Processor 620 may further provide the results of the processing to display 680, recording device 690 or a second processing unit 695.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 610 may also be in two-way communication with each of the sources 605. Processing system 610 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 650 and 670 may also be internal networks or one or more internal connections of a circuit, circuit card or other device, as well as portions and combinations of these and other communication media or an external network, e.g., the Internet and Intranet (wired and wirelessly).

Figure 7A:
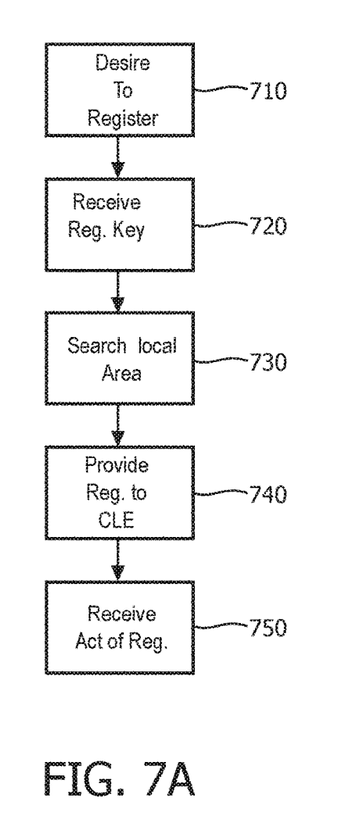
FIGS. 7A-7C illustrate flow charts of exemplary processes in accordance with the principles of the invention.
Figure 7B:
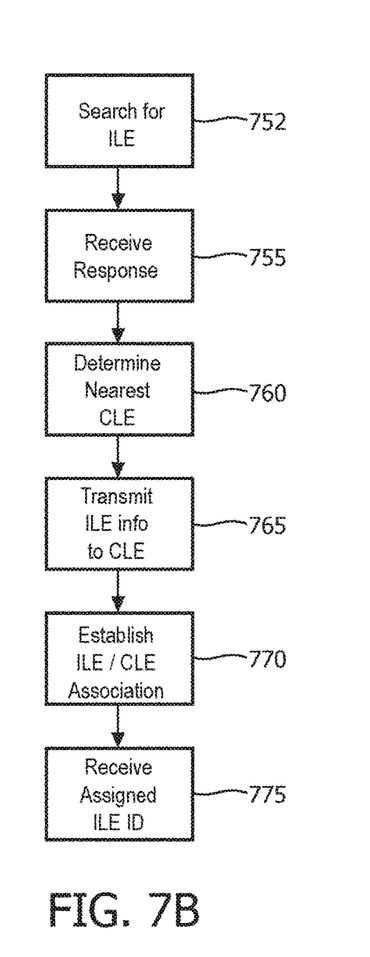
Figure 7C:
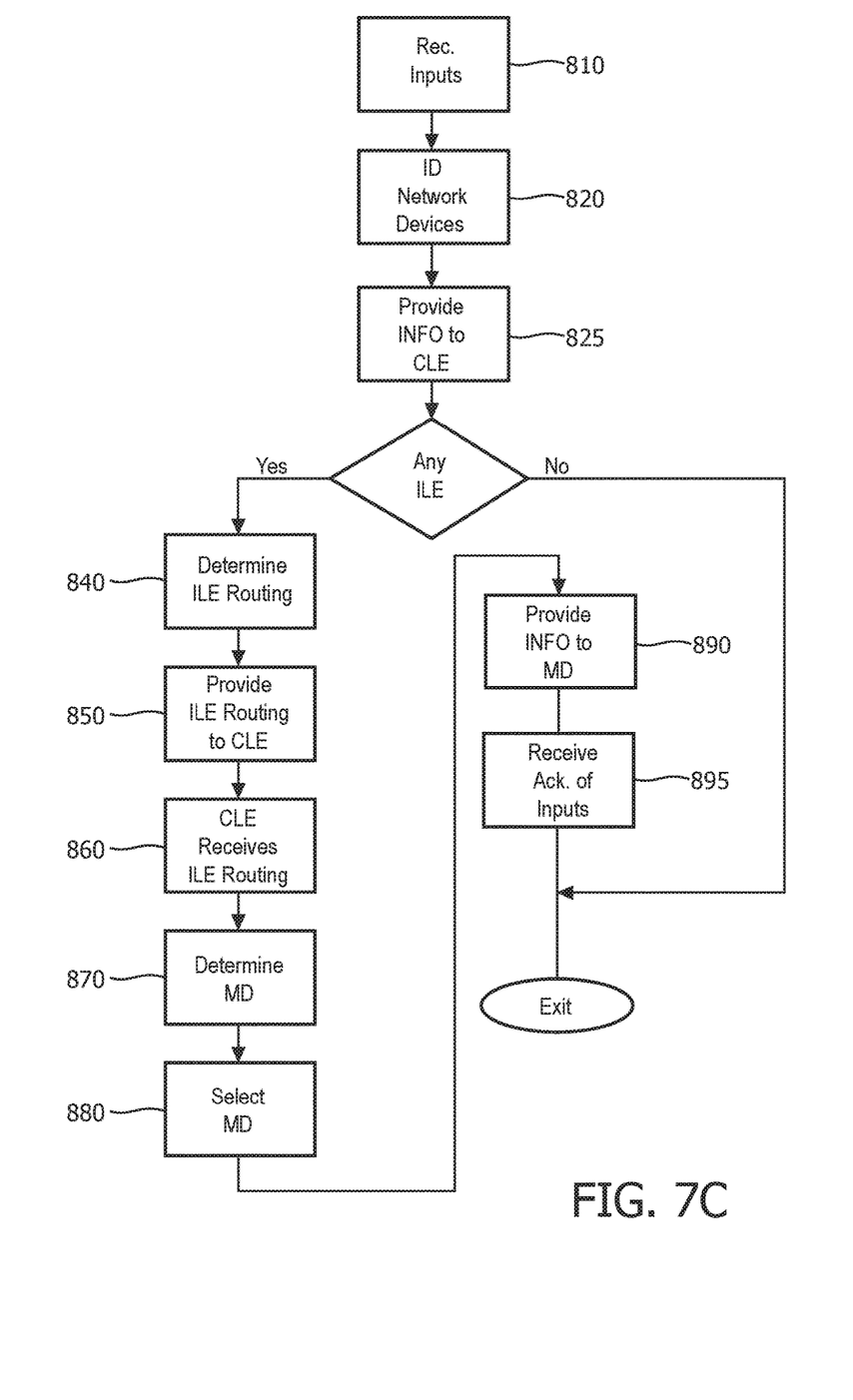

FIGS. 7A-7C illustrate flow charts for implementing each of the exemplary processes described herein.

FIG. 7A illustrates an exemplary process for registering mobile devices 150 to an OLN 100 including an LMS 120, at least one connected lighting element 110 and at least one isolated lighting element 115, in accordance with the principles of the invention.

In this exemplary process, at step 710, mobile device 150 communicates with LMS 120 indicating a desire to register as a virtual communication link with isolated lighting elements 115. Users of mobile devices may be provided incentives for registering with an OLN. For example, a user may desire to be registered with the OLN in order to have outdoor lighting provided in their local area for safety reasons. Alternatively, users may be employees of the companies operating OLNs and may have company-provided mobile devices. These devices may be pre-loaded as registered devices. The mobile devices may be utilized to provide a virtual link to isolated lighting elements 115.

The information provided by the mobile device 150 includes identification information (e.g., telephone number), location information (e.g., GPS location), availability information (time of usage), etc.

At step 720 the mobile device 150 receives a registration key.

At step 730, the mobile device 150 searches the local area for connected lighting elements 110. As would be appreciated, the mobile device 150 may initiate a search by transmitting a beacon information to which connected lighting elements 110 may respond. Alternatively, the mobile device 150 may receive an indication of local connected lighting elements 110 based on the location of the mobile device.

At step 740, the mobile device 150 provides the registration key to the connected lighting elements 110 in the local area of the mobile device 150.

At step 750, the mobile device 150 receives an indication of successful registration (i.e., authentication certification) from the light management system 120. The mobile device 150 retains a record of each of the connected lighting elements 110 to which it may provide a virtual communication link.

FIG. 7B illustrates, at step 752 the mobile device 150 searches using a short range communication protocol for isolated lighting elements 115.

At step 755, the mobile device 150 receives a response to its search request and identifies an isolated lighting element 115. The identified isolated lighting element 115 may then be associated with the communication protocol used to provide the response. At step 760, the mobile device 150 determines a nearest connected lighting element 110 to which the mobile device is registered. For example, the mobile device may use a short range communication protocol to determine a nearest connected lighting element 110. The mobile device 150 may proceed through each of a plurality of different short range protocols to determine a nearest connected lighting element. For example, the mobile device may proceed from a shortest range short-ranged protocol to a longer-ranged protocol searching for one or more connected lighting elements. The connected lighting elements 110 may respond to one or more of the plurality of different short range protocols. The mobile device may retain information regarding which of a plurality of short range capabilities associated with each connected lighting element 110 responding to the short range communications initiated by the mobile device 150. At step 765, the mobile device 150 transmits information regarding the isolated lighting element 115 to the determined nearest connected lighting element 110. At step 770, the mobile device 150 establishes an association (or linkage) between the responsive isolated lighting element 115 and the determined nearest connected lighting element 110. The association may include communication protocols and/or routing information to be used when the mobile device 150 is selected as the virtual link between the connected lighting element 110 and the isolated lighting element 115. At step 775, the mobile device 150 receives an assigned identification of the isolated lighting element 115 and records this information as part of the association information between the determined connected lighting element 110 and the responsive isolated lighting element 115.

FIG. 7C illustrates a flow chart of an exemplary process for providing instruction to an isolated lighting element 115 in accordance with the principles of the invention.

In this exemplary process, at step 810, a request for provisioning (or changing the current provisioning of) the operation of connected and/or isolated lighting elements is received by the LMS 120. At step 820, the LMS 120 identifies network and device configurations and provides the provisioning (or change provisioning) information directly to the connected lighting elements 110. As previously discussed, this may be performed in a directly connected lighting element 110 or those lighting element 110 within a network. The information may be identified or tagged to different lighting elements 110 by an identification associated with the connected lighting elements.

At step 830, a determination is made whether the provisioning (or change provisioning) information is to be provided to an isolated lighting element 115. If not, then no further processing is required.

However, if the information is to be provided to an isolated lighting element 115, then at step 840, routing information regarding the isolated lighting element 115 is determined. This routing information comprises information regarding an associated connected lighting element 110 and the isolated lighting element 115. The routing information may further include information regarding at least one corresponding mobile device 150 providing a virtual path to the isolated lighting element 115.

At step 850, the routing information is provided to the associated connected lighting element 110. The routing information includes information regarding the one or more communication protocols to be used.

At step 860, the associated connected lighting element 110 receives the identification of the isolated lighting element 115 to which provisioning information is to be provided.

At step 870, the associated connected lighting element 110 searches its associated mobile device 150 list to determine at least one mobile device 150 suitable for providing a link to the isolated lighting element 115.

At step 880, the connected lighting element 110 selects one of the mobile devices 150 to operate as a communication link. In this selection, the connected lighting element determines, for example, the availability of the mobile device (e.g., is it on? Or in use? Is it designated as a virtual path at this time?), the location of the mobile device (is it within range of the isolated lighting element? Or will it be?), etc. In addition, the selection of at least one mobile device 150 may be based on achieving a highest reliability of communication between the mobile device 150 and the isolated lighting element 115.

At step 890, the connected lighting element 110 provides the provisioning (or change provisioning) information to the selected mobile device for subsequent transmission to the isolated lighting element 115.

At step 895, the connected lighting element 110 receives an acknowledgement that the isolated lighting element 115 has received the provisioning (or change provisioning) information and forwards the acknowledgement to the LMS 120.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Furthermore, a computer, a processor and/or dedicated hardware/software are described herein as being capable of performing the processing described herein, and it would be recognized that a computer, a processor and/or dedicated hardware/software are well-known elements in the art of signal processing and, thus, a detailed description of the elements of the processor need not provided in order for one skilled in the art to practice the invention described, herein.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for light management in an outdoor lighting network comprising at least one light management system, at least one connected lighting element in communication with the at least one light management system and at least one isolated lighting element not in communication with said at least one light management system, said method, operable in a processor within a mobile device, wherein said mobile device including one or more mobile communication protocols, said method causing the mobile device to:
   register with said at least one light management system;
   associate, when the mobile device is in communication range of both the at least one isolated lighting element and the at least one connected lighting element, said at least one isolated lighting element with said at least one connected lighting element; and
   provide a communication link, using the one or more mobile communication protocols, between said at least one connected lighting element and said at least one isolated lighting element.

2. The method of claim 1, wherein said method includes providing a unique identification to said mobile device, wherein said unique identification is received from one of said at least one light management system and said at least one connected lighting element.

3. The method of claim 2, wherein said unique identification is pre-loaded.

4. The method of claim 1, wherein said registration further comprises:
   providing capabilities of said mobile device to said at least one light management system.

5. The method of claim 1, further comprising:
   determining short-range communication capabilities of said at least one isolated lighting element; and
   communicating with said at least one lighting element using a selected one of said determined short-range communication capabilities.

6. The method of claim 5, wherein said selected short-range capability is based on achieving a high degree of reliability.

7. The method of claim 6, wherein said selected short-range capability is based on at least one of: cellular communication protocol, WIFI, BLUETOOTH, ZigBee, Near Field Communication, Dedicated Short Range Communication, infra-red, and visible light.

8. The method of claim 1, further comprising:
receiving an identification of said at least one isolated lighting element.

9. The method of claim 8, said association including said identification of said at least one isolated lighting element.

10. The method of claim 1, wherein said communication link with said connected lighting element is one of: short range and long range.

11. A mobile device operable including one or more mobile communication protocols, in a light management network, said mobile device comprising:
a processor in communication with a memory, said memory includes instructions, which when accessed by the processor, causes the processor to:
perform a registration process with the light management network;
determine at least one isolated lighting element not in communication with said light management network;
determine at least one connected lighting element in said light management network, wherein said at least one connected lighting element is in communication with said light management network;
receive an assigned identification of said determined at least one isolated lighting element; and
establish, when the mobile device is in communication range of both the isolated lighting element and the connected lighting element, an association between said determined at least one isolated lighting element and said at least one connected light element, wherein said mobile device provides a virtual communication path, using the one or more mobile communication protocols, between said associated at least one isolated lighting element and said at least one connected lighting element.

12. The mobile device of claim 11, wherein said registration process comprises:
receiving as registration identification;
communicating capabilities of said mobile device; and
providing said registration identification to said determined at least one connected lighting element.

13. The mobile device of claim 12, wherein said registration identification is pre-loaded.

14. The mobile device of claim 12, wherein establishing an association between said determined at least one isolated lighting element and said at least one connected light element comprises:
receiving information from said at least one connected lighting element, said information including at least information regarding an identified at least one isolated lighting element; and
selecting a short range communication protocol associated with said identified at least one isolated lighting element.

15. The mobile device of claim 14, wherein said selected short range communication protocols is based on at least one of: a distance between said mobile device and said selected isolated lighting element and to achieve a high reliability of communication.

16. The mobile device of claim 11, wherein said determined at least one isolated lighting element in said light management network comprises:
transmitting a beacon signal using at least one short range communication protocol;
identifying each of said at least one isolated lighting element responding to said beacon signal; and
associating at least one short range communication protocol with each of said identified said at least one isolated lighting element.

17. The mobile device of claim 11, wherein said determined at least one connected lighting element comprises:
transmitting a beacon signal using at least one communication protocol;
identifying each of said at least one connected lighting element responding to said beacon signal; and
associating at least one communication protocol with each of said identified said at least one connected lighting element.

18. The mobile device of claim 11, wherein said associating comprises:
information regarding a protocol of said at least one isolated lighting element with a communication protocol of said at least one connected lighting element.

19. A light management network comprising:
a light management system;
a connected lighting element in communication with said light management system;
an isolated lighting element; and
a mobile device providing communication linkage between said connected lighting element and said isolated lighting element, wherein said mobile device creates an association between said isolated lighting element and said connected lighting element, said association representing a short range communication protocol associated with said isolated lighting element and a communication protocol associated with said connected lighting element.

20. The light management network of claim 19, wherein said mobile device is registered with said light management system.

21. The light management network of claim 19, wherein a protocol selected for communication between said mobile device and said isolated lighting element is selected based on a distance between said mobile device and said isolated lighting element.

* * * * *